May 11, 1926.
J. R. BRINKEMA
1,584,604
SELF DUMP BUNDLE CARRIER
Filed Oct. 31, 1919   3 Sheets-Sheet 1
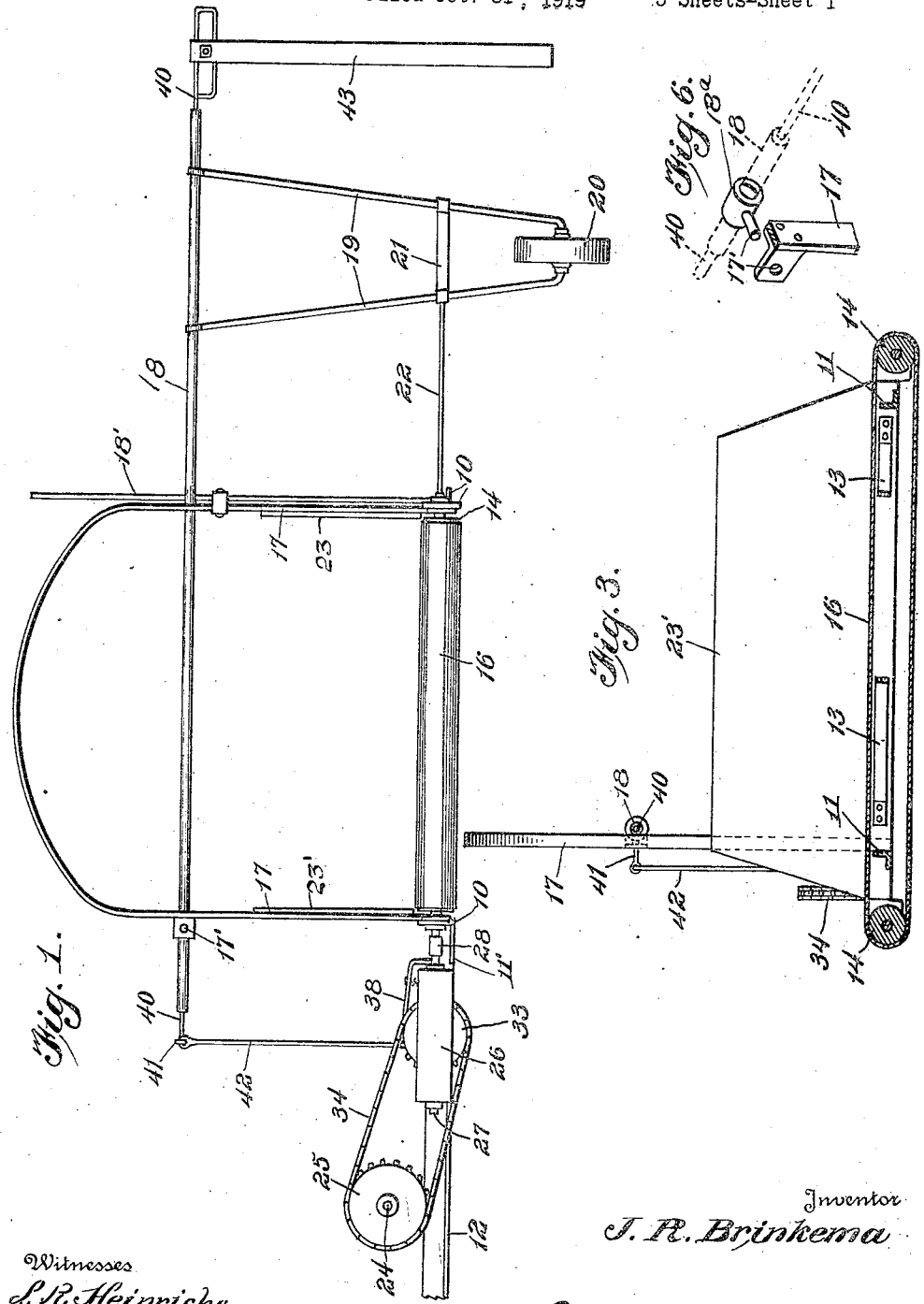

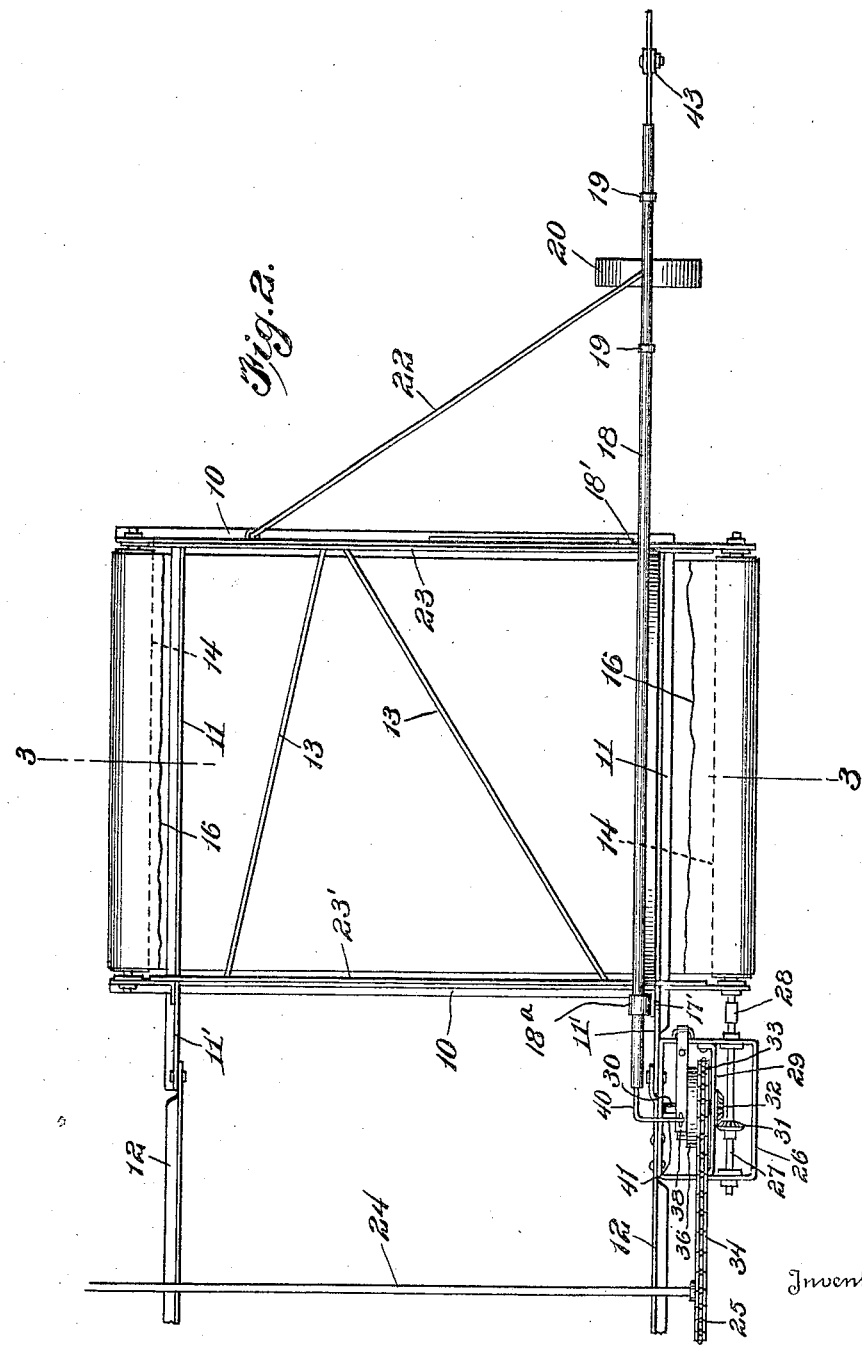

May 11, 1926.
J. R. BRINKEMA
1,584,604
SELF DUMP BUNDLE CARRIER
Filed Oct. 31, 1919  3 Sheets-Sheet 3
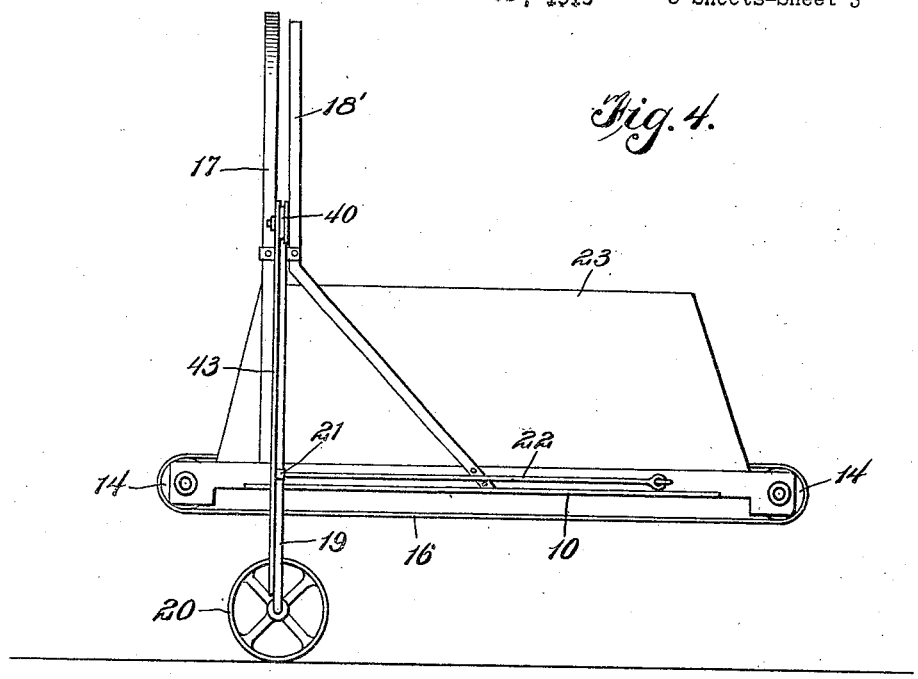
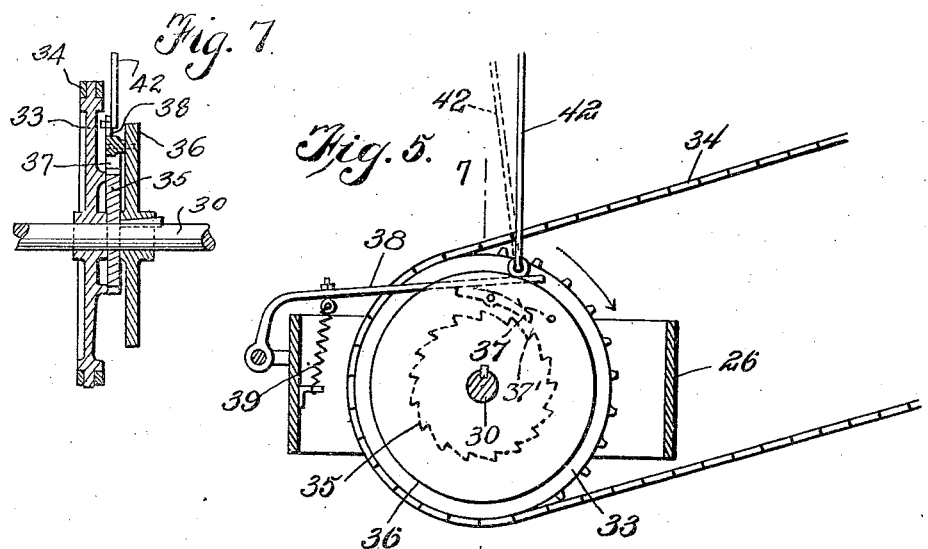
Inventor
J. R. Brinkema
Witnesses
L. R. Heinrichs
By Victor J. Evans
Attorney Patented May 11, 1926.

1,584,604

UNITED STATES PATENT OFFICE.

JOHN R. BRINKEMA, OF GLENVIL, NEBRASKA.

SELF-DUMP BUNDLE CARRIER.

Application filed October 31, 1919. Serial No. 334,691.

This invention comprehends the provision of a portable carrier designed for association with a grain binder, to receive the bundle therefrom, the conveyor being automatically operable intermittently to deposit the bundle upon the ground at predetermined locations.

In carrying out my invention, I make use of an obstacle actuated trip, which controls the operation of the conveyor, the parts being so disposed that the bundle is automatically dumped or removed from the conveyor and arranged in rows upon the ground.

The nature and advantages of the invention will be better understood when the following detail description is taken in connection with the accompanying drawings, the invention residing in the construction, combination and arrangement of parts as claimed.

In the drawings forming part of the specification, like numerals of reference indicate similar parts in the several views and wherein:—

Figure 1 is a rear elevation.

Figure 2 is a top plan view.

Figure 3 is a sectional view taken on the line 3—3 of Figure 2.

Figure 4 is a side elevation.

Figure 5 is an enlarged detail sectional view showing the component parts of the clutch mechanism operatively associated.

Figure 6 is a view showing the manner of pivoting the trip-rod and Figure 7 is a section on line 7—7 of Figure 5.

The conveyor forming the subject matter of my invention, embodies, a frame made up of parallel side members 10 and end members 11. The frame may be constructed from any suitable material, but is preferably constructed of angle-iron. The end members 11 extend an appreciable distance beyond one of the side members 10, as at 11′ and are pivotally connected with the frame of the grain binder. The side members 10 at points between the end members 11, are connected by means of a substantially V-shaped bracing element 13 to afford the frame the desired strength and durability. Journaled between the side members 10 at opposite ends of the frame are rollers 14 over which is trained an endless conveyor 16. Rising from the side members 10 adjacent the rear end of the frame, are parallel standards 17 one of which pivotally supports as at 17′ a horizontally disposed pipe 18, which projects an appreciable distance beyond one of the side members 10 of the frame. Forwardly of the pipe 18 is disposed an upright 18′ secured at its lower end to one of the side bars 10. This upright 18′ and the adjacent standard 17 form a guide or brace for the pipe 18 permitting its movement therebetween on an arc described from its pivot 17′. Secured to the pipe 18 is a collar 18ª from which projects the pivot 17′ as shown in Figure 6. This provides for the pivotal movement of the frame as will be readily understood. Depending from the extended portion of the pipe 18 are the convergingly disposed arms 19, between which the ground engaging wheel 20 is journaled, the corresponding lower extremities of the arms 19 constituting an axle for the wheel. The arms 19 are connected by the member 21 to afford the arms the desired rigidity, while a diagonally disposed brace rod 22, is terminally connected with the member 21 and the adjacent side 10 of the frame. Obviously, the wheel 20 assists in supporting the frame in spaced relation to the ground, and allows the frame to be conveniently moved over the ground or surface with the grain binder to which it is attached. In practice, the bundle is transferred from the grain binder onto the conveyor 16, and the latter operates to deposit the bundle upon the ground at a predetermined point or location. A short vertically disposed wall 23 rises from the side of the frame most remote from the grain binder, the wall 23 preventing the bundles from falling off the conveyor 16 while it is being transferred from the binder to the conveyor. A similar wall 23′ rises from the opposite side of the conveyor frame to keep the bundles from interfering with the working parts of the binder.

A shaft 24 is journalled on the frame of the binder and has fixed thereto a sprocket wheel 25. A substantially rectangular frame 26 is secured to one side of the binder frame as shown. A shaft 27 is journaled between the parallel side members of the frame 26 and has one end connected with the adjacent extremity of the adjacent roller 14 by means of a suitable coupling 28. A transversely disposed member 29 connects the parallel sides of the frame 26, and constitutes a bearing for the shaft 30 which is arranged at right angles to the shaft 27. A bevel gear 31 carried by the shaft 27 meshes with a similar gear 32 supported by the adjacent end of the shaft 30, so that when the latter mentioned shaft is rotated, a similar movement will be imparted to the shaft 27 to operate the conveyor. Loosely mounted upon the shaft 30 is a sprocket wheel 33, over which and the sprocket wheel 25 is trained the chain 34. Rigidly connected to the sprocket 33 is a ratchet wheel 35. Fixed with relation to the shaft 30 for rotation therewith, is a disk 36 upon one side of which is pivoted a pawl 37. The pawl is normally held out of engagement from the ratchet wheel 35, in a manner to be hereinafter described, so that the conveyor will not be continuously operated. However, when the pawl 37 is released and permitted to engage the ratchet wheel 35, the shaft 30 is rotated, and thru its connection with the shaft 27, rotates the latter to operate the conveyor. The pawl 37 is normally held out of engagement with the ratchet wheel 35, by the arm 38 which is pivoted upon the frame 26 and horizontally disposed to overlie the adjacent extremity of the pawl 37. The spring 39 is terminally connected with the frame 26 and with the arm 38, and functions to hold the latter horizontally disposed in an engagement with the pawl 37 to hold the latter out of engagement with the ratchet wheel 35. Manifestly, the arm 38 must be lifted to permit the pawl 37 to gravitate into operative association with the ratchet wheel 35 when it is desired to operate the conveyor 16. A leaf spring 37' engages the pawl 37 and assists to move the pawl in operative association with the ratchet wheel 35.

For this purpose I employ a shaft 40 which is passed thru the pipe 18 for rotation therein. The shaft projects beyond the opposite ends of the pipe 18 and has an offset end portion 41 which is connected with the free end of the arm 38 by means of a chain or other suitable element 42. Depending from the opposite end of the shaft 40 is an obstacle actuated trip 43, which when actuated, partly rotates the shaft 40 and elevates the offset extremity 41 thereof to lift the arm 38 out of engagement with the pawl 37.

In practice, a cable 42 connected with the arm 38 and leading to the driver's seat, is utilized to lift the arm 38 out of engagement with the pawl 37, during the first round of the binder and conveyor. The bundles are thus distributed at certain points or locations in the field. Subsequent to the first round, the bundle is transferred from the binder onto the endless conveyor 16 whereby the trip 43 comes in contact with the bundle upon the ground, the shaft 40 is rotated in a direction to elevate the offset extremity 41 thereof, thus exerting a pull upon the element 42 and lifting the arm 38 out of engagement with the pawl. The pawl 37 then moves into active association with the ratchet wheel 35, thus throwing the gears into operation and actuating the endless conveyor 16, while the trip 43 is passing over the bundle. As the endless conveyor is operated the bundle thereon is deposited upon the ground surface in juxtaposition to the bundle engaged by the trip 43. After the trip 43 has moved or passed over the bundle, the spring 39 functions to lower the arm 38 into engagement with the pawl 37, whereupon the latter is moved out of engagement with the ratchet wheel 35 and the endless conveyor held inactive.

The extensions 11' of the frame are pivoted to the binder frame 12 so that the conveyor frame, and its associated parts can be elevated in any suitable manner when the binder is working close to a fence, or passing thru a gate, occupying an out-of-the-way position. In order to elevate the frame, the coupling 28 must be first disconnected from the adjacent roller 14. The conveyor may be held in an elevated position in any suitable manner.

While I have shown and described what I consider the preferred embodiment of the invention, I desire to have it understood that I do not limit myself in this connection, and that such changes may be resorted to when desired as fall within the scope of what is claimed.

What I claim is:—

1. A grain binder attachment comprising a portable frame, an endless conveyor thereon, means for operating the conveyor intermittently, including a driven shaft and a continuously rotatable driving shaft, a pawl and ratchet mechanism controlling the operation of said conveyor, means for normally holding the pawl out of engagement from the ratchet, and an obstacle actuated trip for releasing said pawl, and allowing the latter to move into operative association with the ratchet for the purpose specified.

2. A grain binder attachment comprising a portable frame, an endless conveyer thereon, a driving connection for said conveyer, a ground engaging wheel, a support for said wheel having a pivotal mounting at one end, a rock shaft carried by said support, an obstacle trip carried at the outer end of said rock shaft, and means at the inner end of said shaft for controlling said driving connection for the conveyer.

3. A grain binder attachment comprising a frame, an endless conveyer thereon, driving means for said conveyer, a ground engaging wheel, a tubular support for said wheel, a rock shaft extended through said support, an obstacle trip mounted upon the outer end of the rock shaft to oscillate in a vertical plane, and means extended from the inner end of the rock shaft for controlling said driving connection for the conveyer.

4. A grain binder attachment comprising a portable frame, an endless conveyer thereon, means for operating the conveyer, an obstacle actuated trip adapted to oscillate in a vertical plane and having a shaft extending transversely of the conveyer, a normally disengaged driving mechanism for said conveyer, and means connected to the trip to cause engagement of said mechanism when the trip is in raised position.

In testimony whereof I affix my signature.

JOHN R. BRINKEMA.